(12) United States Patent
Krueger et al.

(10) Patent No.: US 12,459,603 B2
(45) Date of Patent: Nov. 4, 2025

(54) FLUID ENTRAPMENT VIA PERFORATED SURFACES FOR DRAG REDUCTION

(71) Applicant: Southern Methodist University, Dallas, TX (US)

(72) Inventors: Paul S. Krueger, Plano, TX (US); David A. Willis, Dallas, TX (US); Haosen Tan, Dallas, TX (US); Denise Cox, Dallas, TX (US)

(73) Assignee: Southern Methodist University, Dallas, TX (US)

( * ) Notice: Subject to any disclaimer, the term of this patent is extended or adjusted under 35 U.S.C. 154(b) by 500 days.

(21) Appl. No.: 17/975,441

(22) Filed: Oct. 27, 2022

(65) Prior Publication Data

US 2023/0131080 A1  Apr. 27, 2023

Related U.S. Application Data

(60) Provisional application No. 63/272,579, filed on Oct. 27, 2021.

(51) Int. Cl.
*B63B 1/38* (2006.01)
*B60V 3/06* (2006.01)
(Continued)

(52) U.S. Cl.
CPC .................. *B63B 1/38* (2013.01); *B60V 3/06* (2013.01); *B60V 3/065* (2013.01); *B63B 1/34* (2013.01);
(Continued)

(58) Field of Classification Search
CPC ....... B63B 1/38; B63B 1/34; B63B 2001/387; B60V 3/06; B60V 3/065; F15D 1/12; F15D 1/008; F15D 1/003
See application file for complete search history.

(56) References Cited

U.S. PATENT DOCUMENTS 5,575,232 A * 11/1996 Kato .......................... B63B 1/38
  114/67 A
5,803,410 A *  9/1998 Hwang ................. B64C 21/025
  114/67 A
(Continued)

OTHER PUBLICATIONS

Tingting et al (Surface hydrophilic modification of acrylonitrile-butadiene-styrene terpolymer by poly(ethylene glycol-co-1,4-cyclohexanedimethanol terephthalate), ELSEVIER, Applied Surface Science, 2016 (Year: 2016).*
(Continued)

*Primary Examiner* — Brian Christopher Delrue
(74) *Attorney, Agent, or Firm* — Edwin S. Flores; Daniel J. Chalker; Chalker Flores, LLP (57) ABSTRACT

A reduced drag surface involves a perforated or porous surface exposed to a flowing fluid and a slip interface disposed between the surface and the flowing fluid, wherein the slip interface is formed from an entrapped fluid trapped at the surface. A method for modifying a drag coefficient on a reduced drag surface involves the steps of supplying a fluid to a perforated or porous surface exposed to a flowing fluid, wherein the surface traps the fluid at the surface to form an entrapped fluid and forming a slip interface between the surface and the flowing fluid, wherein the slip interface is formed from the entrapped fluid. An apparatus for a reduced drag surface includes the reduced drag surface described above and a source of fluid fluidically coupled to the surface such that the source supplied fluid to the surface to form the entrapped fluid.

21 Claims, 5 Drawing Sheets

(51) Int. Cl.
    *B63B 1/34* (2006.01)
    *F15D 1/00* (2006.01)
    *F15D 1/12* (2006.01)
(52) U.S. Cl.
    CPC .......... *F15D 1/12* (2013.01); *B63B 2001/387* (2013.01); *F15D 1/008* (2013.01)

(56) References Cited

U.S. PATENT DOCUMENTS

| | | | | |
|---|---|---|---|---|
| 6,092,480 | A * | 7/2000 | Takahashi | B63B 1/38 |
| | | | | 114/67 A |
| 6,679,192 | B2 * | 1/2004 | DeMarco | B63B 1/38 |
| | | | | 114/67 A |
| 7,004,094 | B2 * | 2/2006 | Carson | B63B 1/34 |
| | | | | 114/67 A |
| 10,032,445 | B1 * | 7/2018 | Linch | B32B 27/08 |
| 11,149,766 | B2 * | 10/2021 | Dalmas | F15D 1/12 |
| 11,814,973 | B2 * | 11/2023 | Zheng | F01D 5/189 |
| 11,965,425 | B2 * | 4/2024 | Wood | F04D 29/542 |
| 12,097,932 | B2 * | 9/2024 | Dixon | B63B 59/04 |

OTHER PUBLICATIONS

Abnett, Kate, et al.; EU Planning Sustainable Fuel Target to Cut Airline Emissions; (Dec. 11, 2020); (12 Pages).

Carlborg, Carl F., et al.; Sustained Superhydrophobic Friction Reduction at High Liquid Pressures and Large Flows; (Dec. 1, 2010); "American Chemical Society"; (8 Pages).

Fu, M. K., et al.; Liquid-infused surfaces as a passive method of turbulent drag reduction; "Journal of Fluid Mechanics"; (Jul. 10, 2017); p. 688-700; vol. 824; Cambridge University Press; (8 Pages).

Hauck, Mara, et al.; Estimating the Greenhouse Gas Balance of Individual Gas-Fired and Oil-Fired Electricity Plants on a Global Scale; "Journal of Industrial Ecology"; (Feb. 26, 2016); p. 127-135; vol. 21; Nijmegen, the Netherlands; (3 Pages).

Lauber, Dr. Uwe; Corporate Responsibility Report; May 15, 2020; Munich, Germany; (64 Pages).

Lee, Choongyeop, et al.; Underwater Restoration and Retention of Gases on Superhydrophobic Surfaces for Drag Reduction; (Aug. 25, 2010); (3 Pages).

Li, Zhe, et al.; A porous superhydrophobic surface with active air plastron control for drag reduction and fluid mpalement resistance; "Journal of Materials Chemistry A"; (Jun. 17, 2019); p. 16387-16396; 27; (6 Pages).

Makiharju, Simo A., et al.; On the energy economics of air lubrication drag reduction; "Inter J Nav Archit Oc Engng"; (2012); p. 412-422; SNAK; (11 Pages).

Placek, Martin; Container shipping—statistics & facts; (May 4, 2022); "Container Shipping Worldwide"; (6 Pages).

Sanders, Wendy C., et al.; Bubble friction drag reduction in a high-Reynolds-number flat-plate turbulent boundary layer; (Mar. 29, 2006); p. 353-380; vol. 552; "Cambridge University Press"; (4 Pages).

Saul, Jonathan; Ship Industry Proposes $5 Bln Research Fund to Help Cut Emissions; (Dec. 18, 2019); Thomson Reuters Foundation; (9 Pages).

Van Buren, Tyler, et al.; Substantial drag reduction in turbulent flow using liquid-infused surfaces; "Journal of Fluid Mechanics"; (Aug. 24, 2017); p. 448-456; vol. 827; Cambridge University Press; (7 Pages).

Yanuar, N. et al.; Characteristics of Drag Reduction by Guar Gum in Spiral Pipes; "UTM Jurnal Teknologi"; (Aug. 2012); vol. 58; UTM; (4 Pages).

* cited by examiner

FLUID ENTRAPMENT VIA PERFORATED SURFACES FOR DRAG REDUCTION

CROSS-REFERENCE TO RELATED APPLICATION

This application claims the benefit of provisional U.S. Application No. 63/272,579 entitled "Fluid Entrapment Via Perforated Surfaces For Drag Reduction" filed Oct. 27, 2021, the entirety of which is incorporated herein in its entirety.

STATEMENT OF FEDERALLY FUNDED RESEARCH

This invention was made with U.S. Government support awarded by the NSF grant number 1510707. The government has certain rights in this invention.

TECHNICAL FIELD OF THE INVENTION

This invention relates to a reduced drag surface for use on a vehicle that passes through a fluid.

BACKGROUND OF THE INVENTION

U.S. airlines alone consumed around 17 billion gallons of fuel annually in 2016 (Schipper, 2017). Container ships also consume a massive amount of fuel. Fuel consumption for ships with a capacity of 2200-3000 teu (20 ft. containers) is 45-65 tons of fuel per day (about 1400-2000 gal/day) depending on size and speed (MAN Energy Solutions, 2019). With more than 5000 container ships worldwide (Statista Research Department, 2020), around 3 billion gallons of fuel are burned annually by container ships (assuming they are active 80% of the time), and this doesn't account for the tens of thousands of other transport ships. Clearly the transportation industry accounts for massive amounts of fuel burn every year. This is well recognized by the transportation industry as the International Maritime Organization has set a goal of 50% reduction in greenhouse gas emissions by 2050 and plans to have zero emission ships in operation by 2030 (Saul, 2019) and the European Union is targeting zero-emission aircraft by 2035 (Abnett and Frost, 2020).

The fuel burned in air and sea transport is primarily to overcome resistance to the vehicle motion provided by fluid dynamic drag. Various efforts are made to minimize this effect through geometry of the vehicles and even the type of paint used on ship hulls. Given the massive scale of the industry, even modest reductions in drag results in billions of dollars of savings as well as large reductions in emissions that can harm the environment or can improve transition to zero emission vehicles. Hence, there is substantial economic potential and environmental impact in developing methods for reducing fluid dynamic drag on vehicles.

A method of reducing fluid dynamic drag involves trapping of a gas film near a submerged surface with superhydrophobic (SHPo) surfaces using microtextured features to create a superhydrophobic effect. SHPo surfaces have a number of challenges, including the tendency of the gas film to collapse under increased pressure while submerged, diffusion of the gas layer into the liquid, required close spacing of the microtexture features to maintain the gas layer, and fabrication challenges. Recently, limited attempts have been made to address a few of these challenges, specifically with regard to stabilizing the gas film in heterogeneous wetting. Lee & Kim (2011) stabilized the gas film by electrolysis on the SHPo surface, providing a means of re-establishing a film after collapse. This required that a secondary smaller (nanoscale) texture was fabricated between microstructures to trap gas. Though effective, the method was slow, requiring 150 sec to re-initialize the entire gas film, and the required electrodes may not integrate well with non-semiconductor materials like flexible elastomers. A more direct approach to stabilizing the gas film is direct control of the gas film pressure. Carlborg & van der Wijngaart (2011) demonstrated the feasibility of this approach for an existing air film. Their method utilized air pockets embedded in a microchannel with a pneumatic connection to the air layer between microtexture features. However, their configuration is not directly extendable to a two-dimensional surface (it was applied to only the side walls in a microchannel) and the ability to rapidly re-initialize a collapsed air film is unclear (the configuration was designed primarily to maintain the existing gas film). Li et al. (2019) provided pneumatic support of air entrapped in a superhydrophobic porous material constructed from sintered Titanium to help stabilize the air gas interface under high hydrodynamic pressure and prevent the liquid from being forced into the pores under these conditions. The approach was effective, but only contemplated high-density, porous, hydrophobic materials for supporting the air film at the surface. A need exists for a new system of reducing drag.

SUMMARY OF THE INVENTION

The present invention provides a simple method for reducing fluid dynamic drag on vehicles by altering the surface to introduce an apparent fluid slip on the surface that reduces the fluid shear and associated flow resistance developed at the vehicle surface. It does this by trapping a gas next to the surface (in the case of transport through water). Alternatively, it can encapsulate a fluid of the same type next to the surface (liquid in the case of transport through water or gas/air in the case of air transport), which also relaxes the shear next to the surface due to motion of the encapsulated fluid, also producing an apparent slip near the surface. The invention is very versatile and overcomes challenges with other methods such as collapse of entrapped air films under high pressure or limitations to only one type of fluid (liquid or gas).

The inventors have built several prototypes and have demonstrated the apparent slip behavior, indicating the invention is viable for a variety of applications.

The invention described herein can extend and optimize pneumatic stabilization and control of the air film in a SHPo surface to stabilize the air film against pressure disturbances and gas diffusion, aid rapid destruction and re-initialization of the air film for dynamic control of the surface wettability, and allow for larger surface texture spacing to increase the apparent slip length. In particular, the invention differs from the method utilized in Carlborg & van der Wijngaart (2011) by providing independently sized and located pores between the microtexture features in order to control the pneumatic access to the gas film and can also operate without microtexture features at all. Similarly, it differs from Li et al. (2019) in that it utilizes perforated rather than porous materials to support the gas film next to the liquid, and the proposed invention is not limited to hydrophobic materials. Since the current invention does not require surfaces to be hydrophobic, surface coatings are not necessary (although they may be used to enhance performance). Moreover, all of the methods involving SHPo surfaces and microtexturing are limited to drag reduction via liquid-gas interfaces, and are not extendable to liquid-liquid interfaces, gas-liquid (i.e., flowing gas over embedded liquid), or purely gaseous configurations as in the proposed invention. Drag reduction using liquid-infused surfaces (e.g., Fu et al., 2017; Van Buren and Smits, 2017) allows for reducing surface shear by infusing liquid into microstructures on the object surface but requires microstructures to trap the liquid and suffers from slow loss of the liquid over time due to the shear stress applied to the infused fluid by the flowing fluid (which eventually leads to failure of the drag reduction mechanism). The present invention is not limited to microstructures and can continue to resupply the liquid (for a liquid filled cavity) that may be lost due to shearing, overcoming the common limitations of liquid-infused surfaces.

A common way to effect drag reduction on ships and submerged vehicles is to inject microbubbles into the flow near the ship wall. These microbubbles are commonly injected through a slot, porous material, or perforations/holes in the surface (Sanders et al., 2006; Makiharju, et al., 2012; Yanuar et al., 2012). The injected bubbles are free to flow with the fluid once injected, and may migrate away from the wall or rise to the water surface if they are not injected underneath a flat, horizontal hull. In contrast, the invention described herein traps bubbles at the surface so that they are not swept into the flow or allowed to rise to the water surface if the hull is not flat and horizontal.

BRIEF DESCRIPTION OF THE DRAWINGS

These and other features, aspects, and advantages of the present application are described with reference to drawings of certain embodiments, which are intended to illustrate, but not to limit, the present disclosure. It is to be understood that these drawings are for the purpose of illustrating concepts of the present disclosure and may not be to scale.

DETAILED DESCRIPTION

Figure 1A:
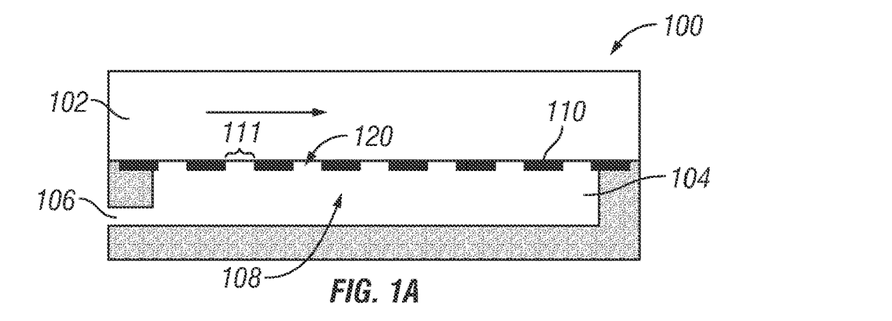
FIG. 1(a)-1(e) is an illustration of multiple embodiments of a fluid entrapment interface.

FIG. 1(a) is an illustration of an embodiment of a fluid entrapment interface 100 comprising a perforated (or porous) surface 110 in contact with a first fluid 102 on one side and a second fluid 104 on the other. Here perforated is distinguished from porous in that a perforated material 110 has a direct line-of-sight through the perforations (holes) in the material while a porous material (as seen in at least FIG. 1(d)) contains a multiplicity of interconnected and offset voids throughout the material volume so that a path through the material is tortuous and there is no direct line-of-site. The fluid entrapment interface 100 may comprise a cavity 108 that may be used to supply the second fluid 104 to the pores 111 on the surface 110. The fluid entrapment interface 100 may comprise a passage 106 for providing the second fluid 104 from a fluid source (not pictured) to the cavity 108.

The pores 111 on the surface 110 may be used to trap the second fluid 104 against the first fluid 102. The perforated surface 110 may be made of either hydrophobic or hydrophilic material.

The first fluid 102 may be a liquid or a gas. The second fluid 104 may also be a liquid or a gas. Unless certain features or methods are specified as requiring a particular combination or type of fluid, the terms "gas," "liquid," and "fluid" may be used interchangeably.

In at least one embodiment, pressurized gas 104 is supplied to the gas cavity 108 through the gas supply channel 106. The gas 104 fills the cavity 108 and perforations 111 in the adjoining perforated surface 110. The gas 104 is trapped in the perforations on the outer surface 110 via surface tension, forming an array of bubbles 120 in contact with the liquid 102. If the pressure of the liquid 102 increases or decreases, the gas 104 pressure can be changed to compensate and maintain the position of the gas bubbles 120 on the outer surface of the perforated material 110. Likewise, if a bubble 120 ruptures due to a disturbance from the liquid 102 flow, additional gas 104 can be supplied to reestablish the bubbles 120 on the surface of the perforated material 110.

The bubbles 120 entrapped on the porous surface 110 effectively replace the solid material that would be at the surface (were it not perforated) with a gas 104 in the perforations. The liquid 102 flowing over the entrapped gas bubbles 120 experiences less resistance due to the free-flowing nature of the gas 104 and its lower viscosity, introducing an effective slip behavior of the liquid 102 at the surface 110 that reduces the flow resistance experienced by the fluid 102. This reduced resistance manifests in various ways, including reduced drag on the flow around immersed objects and reduced pressure drop on flow through pipes and channels.

Figure 1B:
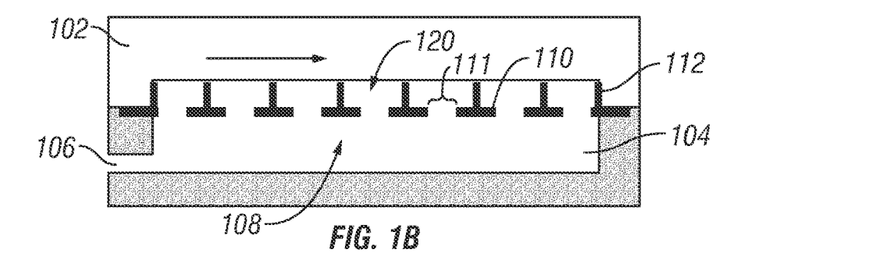

FIG. 1(b) is an illustration of another embodiment of a fluid entrapment interface 100 with a perforated surface 110 that may include microstructure features 112 attached to the side of the perforated surface 110 in contact with the liquid 102. The microstructure features 112 may include but are not limited to geometries such as posts/pillars, waffle patterns, and fences. The microstructures 112 may be created together with the perforations through a molding process, or they may be added to the perforated surface 110 in a separate micro/nano-scale manufacturing process. The function of the microstructural features 112 is to further minimize the contact of the liquid 102 with the perforated surface 110 to enhance the slip effect, while the perforations serve to provide an external pressure and gas supply to stabilize the interface between the gas 104 and the liquid 102 against pressure changes or gas 104 dissolution into the liquid 102. The microstructure features 112 may be made of a hydrophobic material to enhance the surface tension effect that supports the air bubbles 120 between the microstructure features 112 together with the gas pressure in the cavity 108 underneath the perforated surface 110.

Figure 1C:
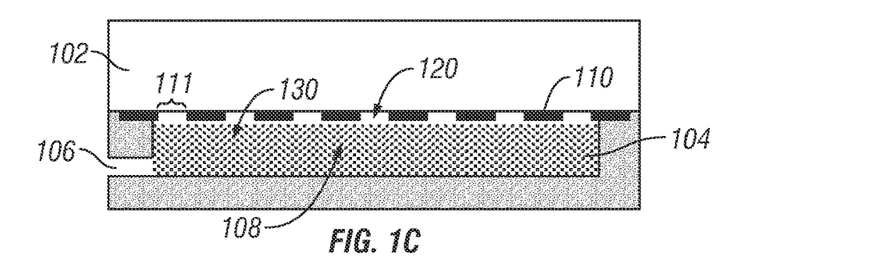

FIG. 1(c) is an illustration of yet another embodiment of a fluid entrapment interface 100 where the gas cavity 108 beneath the perforated surface 110 may be substantially filled with a porous material 130. In this embodiment, the porous material 130 provides structural support to the perforated material 110, which may be very thin. It also mitigates the gas 104 supply so that it is evenly distributed within the cavity 108, which may be difficult to achieve if the cavity 108 is large and the perforations cover a large faction of the surface 110. In another embodiment, the material substantially filling the cavity 108 may be a perforated material (not pictured) with pores (not pictured) offset from those 111 of the porous material 110 in contact with the flowing liquid 102 (two-level perforations).

Figure 1D:
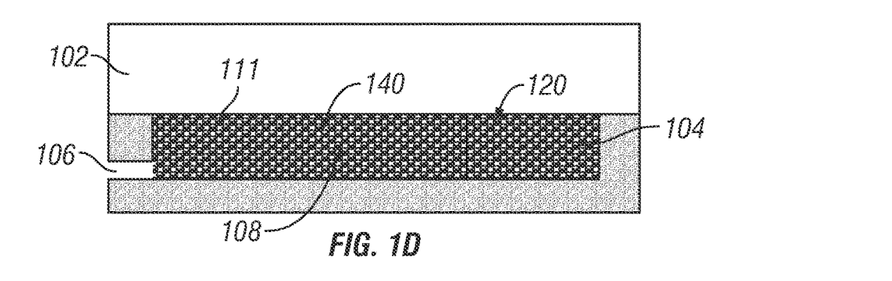

FIG. 1(d) is an illustration of still another embodiment of a fluid entrapment interface 100 where the cavity 108 may be substantially filled with a porous material 140 and where there is no perforated material 110 above it in contact with the liquid 102. In this case, the surface tension acts to hold the gas 104 in the pores 111 on the surface of the porous material 110 to provide an array of bubbles 120 in the pores 111 that provides the effective slip effect with the flowing liquid 102. The gas 104 supplied through the porous material 110 supports the bubbles 120 against pressure variations in the flowing liquid 102.

In another example, perforations may be drilled or otherwise created in the porous material 130 so that the porous material 130 is perforated with holes substantially larger than the size of the pores 111 in the porous material 130. In this embodiment, the gas 104 is supplied to the perforations through the pores 111 in the porous material 130 to create bubbles 120 within the perforations that are in contact with the flowing liquid 102.

Figure 1E:
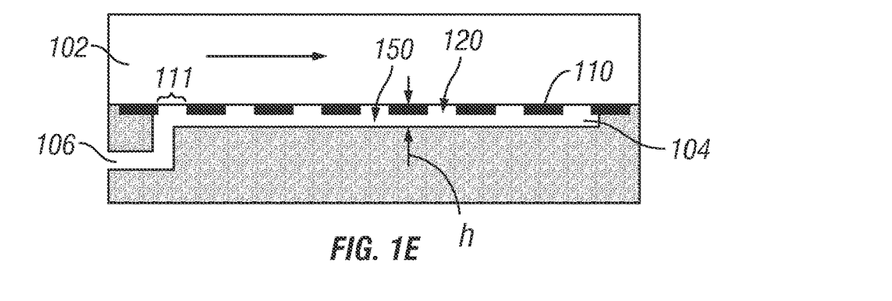
Figure 2A:
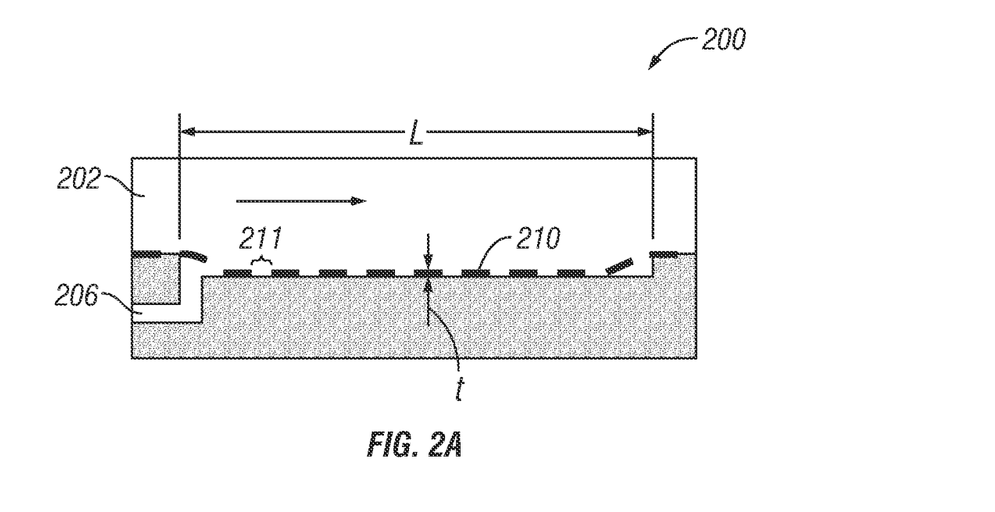
FIG. 2(a)-2(b) is an illustration of multiple embodiments of a fluid entrapment interface configured so that when negative fluid pressure is applied to a cavity to collapse the perforated material, it comes in contact with the surface beneath it.

FIG. 1(e) is an illustration of a still further embodiment of a fluid entrapment interface 100 where the gas 104 may be supplied to the perforated surface 110 through a narrow channel 150 underneath the perforated surface 110. In this embodiment the narrow channel 150—with a height h as seen FIG. 1(e)—is thin enough that the perforated surface 110 can contact the bottom of the channel 150 when a negative pressure is applied to the gas 104 as shown in FIG. 2(a). For a square channel 150 of width and length L (as seen in FIG. 2(a)), this can be achieved if the channel height h is substantially less than $L^4/t^3$, where t is the thickness of the perforated material 110.

FIG. 2(a) is an illustration of a fluid entrapment interface 200. In at least one embodiment, positive gas (not pictured) pressure provides air bubbles (not pictured) and reduced friction for flow of liquid 202 over perforations 211 on a perforated surface 210, whereas negative gas pressure removes the gas from a channel (as seen in FIG. 1(e)) forcing the perforated surface 210 to deflect down and contact the bottom of the channel (as seen in FIG. 1(e)) so that a liquid flow 202 is exposed only to solid material as it flows over the surface 210. In this way, the flow friction can be dramatically and rapidly increased by suddenly removing the gas from the channel (as seen in FIG. 1(e)). Conversely, reversing the gas pressure to refill the channel (as seen in FIG. 1(e)) and perforations with gas will reduce the flow friction. Thus, adjusting the gas supply can serve to control the frictional effects of the fluid flow, which can be used to change the forces on an immersed object for maneuvering or control purposes, or for manipulating the downstream flow by providing a disturbance to the flow at the surface 210.

Figure 2B:
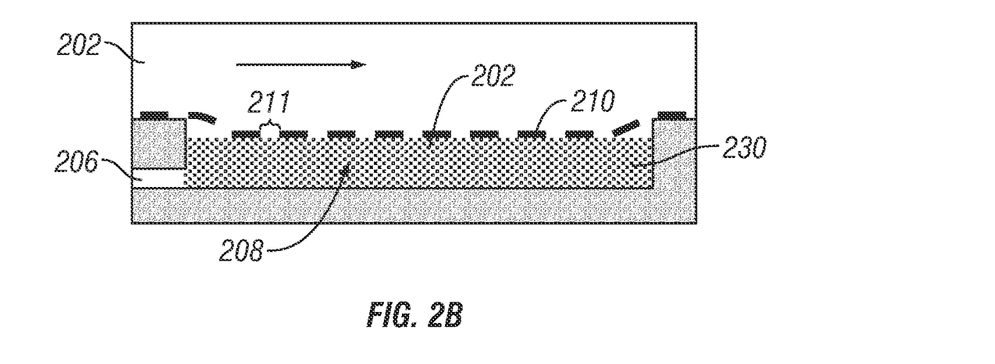

FIG. 2(b) is an illustration of another embodiment of a fluid entrapment interface 200 that can be utilized in a similar way to the embodiment in FIG. 1(c) if a porous material 230 is very dense and substantially fills a cavity 208 so that when the gas is removed the perforated material 210 will contact the porous material 230. In this case, the liquid 202 flow is in contact with both solid and porous material, which may not increase the flow friction as much as the case where the fluid 202 is completely in contact with solid material as in FIG. 2(a), but it can nevertheless provide a change in the flow resistance by extracting or resupplying the gas to the cavity 208.

Figure 3A:
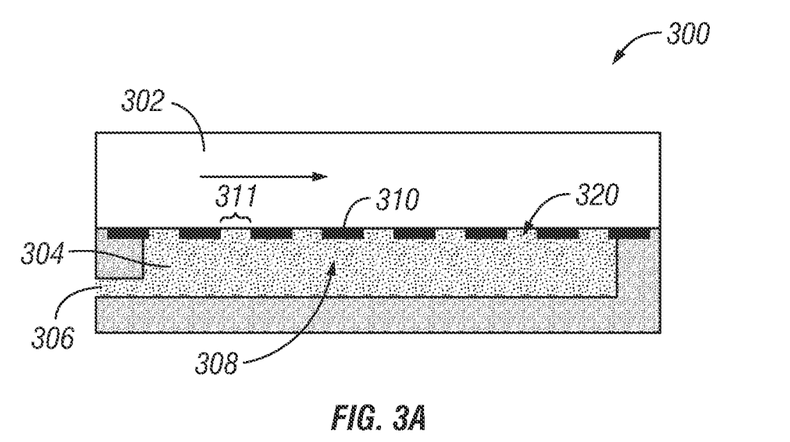
FIG. 3(a)-3(b) is an illustration of multiple embodiments of a fluid entrapment interface configured where a liquid fills the cavity.

FIG. 3(a) is an illustration of an embodiment of a fluid entrapment interface 300 where a second fluid 304 fills a cavity 308 through a passage 306 with a liquid rather than a gas and where a first fluid 302 and the second fluid 304 are both liquids. The second fluid 304 may form bubbles 320 in pores 311 of a perforated or porous surface 310 reducing drag. This embodiment can include an open cavity 308 as in FIG. 3(a) (at least corresponding to FIG. 1(a)).

Figure 3B:
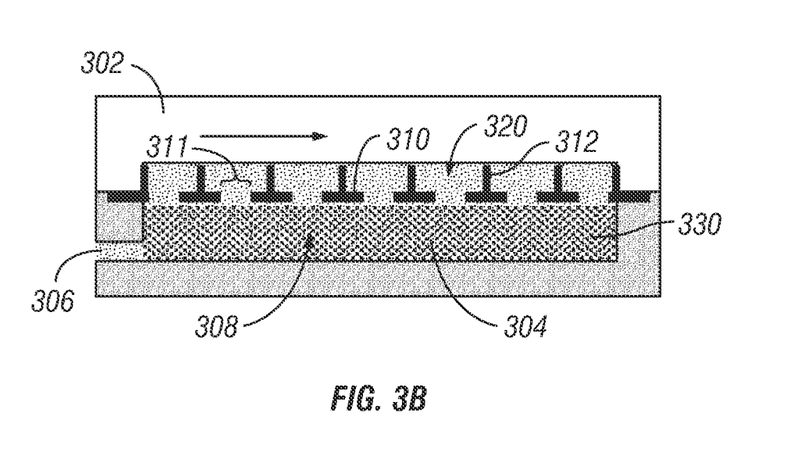

FIG. 3(b) is an illustration of an embodiment of a fluid entrapment interface 300 where a second fluid 304 fills a cavity 308 filled with a porous material 330 as in FIG. 3(b) (at least corresponding to FIG. 1(c)). In at least one embodiment, the first fluid 302 and the second fluid 304 are both liquids. The second fluid 304 may form bubbles 320 in pores 311 of a perforated or porous surface 310 reducing drag. The perforated surface 310 may include miscrostructures 312 that assist in trapping the second fluid 304 at the surface 310.

In one embodiment, when the cavity 308 is filled with the second liquid 304 and the first liquid 302 flows over a perforated material 310, the viscosity difference between the two liquids may not be as great as that between a liquid and a gas, but the extra volume provided by the space below the perforated surface 310 and/or surface microstructures 312 will spread out the fluid shear vertically so that the shear— and corresponding flow friction—experienced by the first fluid 302 as it flows over the surface 310 will be less, again providing an effective slip effect.

In at least one example, the second liquid 304 may be of any type (water, oil, polar, non-polar, etc.), and can even be the same as the first liquid 302. The advantage of using a liquid for both fluids is that the presence of the liquid in the perforations 311 is not dictated by surface tension, so the configuration will be more stable under high shear conditions. Additionally, if the second liquid 304 is not the same as the first liquid 302, then any liquid 304 lost through the perforations 311 due to surface shear may be replaced via a supply channel 306. If, on the other hand, the first fluid 302 is a gas, then using a liquid or a gas as the second fluid 304 also provides an effective slip for the same reason as if a liquid is used for both fluids. Hence, the proposed invention is extremely versatile in providing a means for supplying effective slip and corresponding drag reduction in a wide range of fluid types and flow configurations.

Furthermore, if the first fluid 302 and the second fluid 304 are of the same type (both the same gas or both the same liquid), the effective slip may be enhanced by providing a constant supply of fluid 304 to the cavity so that it is expelled through the perforations 311 into the flowing stream of the first fluid 302.

Figure 4:
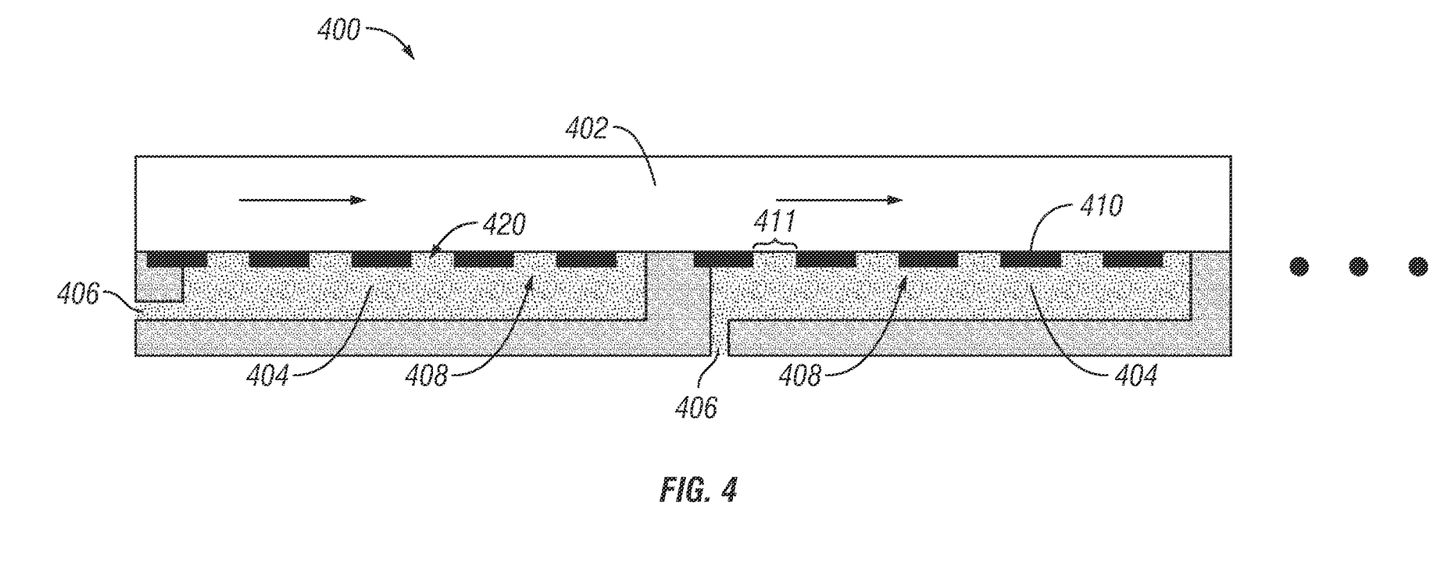
FIG. 4 is an illustration of an embodiment of a fluid entrapment interface configured with multiple cavities on the same surface.

FIG. 4 is an illustration of a fluid entrapment interface 400 that shows a multiplicity of cavities 408 along a surface 410 in contact with a first fluid 402 through pores 411 (at least corresponding to the configuration shown in FIG. 1(a)). Second fluid 404 supplies may be separately controlled for each cavity 408 or may be all connected together to provide a single fluid injection point for all cavities 408. For separately controlled cavities 408, the pressure supplied to each cavity 408 through a passage 406 may be different to compensate for pressure gradients in the external fluid 402 flowing over the surface.

Figure 5:
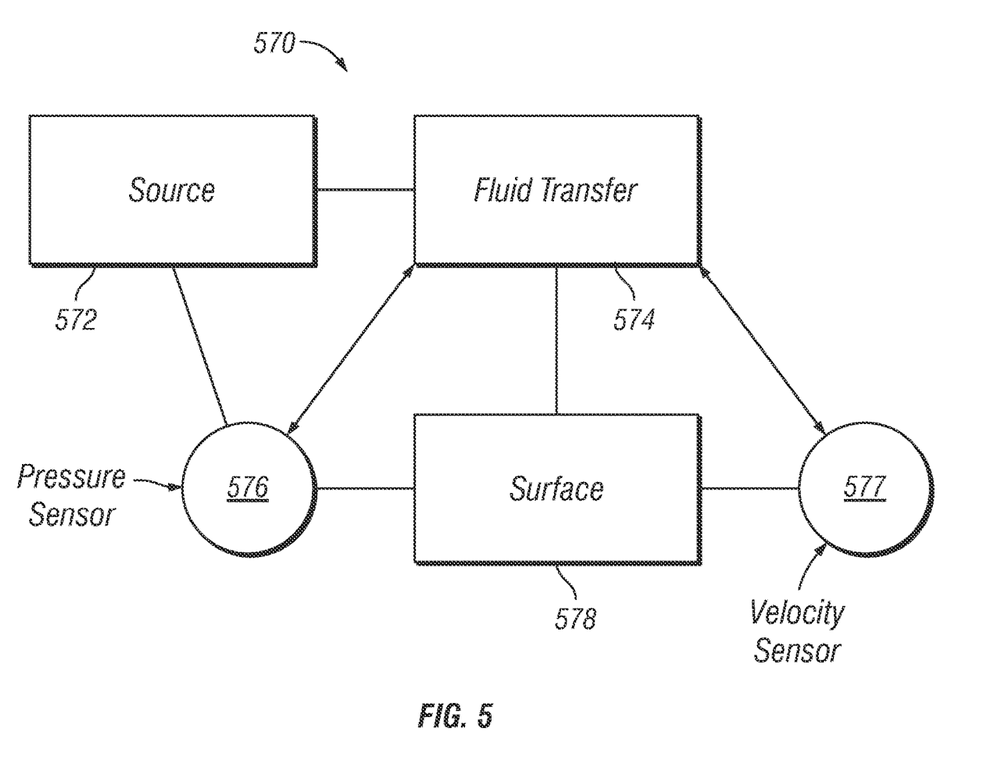
FIG. 5 is an illustration of an environment in which components and/or methods described herein, may be implemented.

FIG. 5 is an illustration of an environment 570 in which components and/or methods described herein, may be implemented. The environment 570 may contain a fluid transfer device 574 fluidically coupled to a fluid source 572 and a perforated or porous surface 578. The fluid transfer device 574 may be a conduit for transporting fluid from the fluid source 572 to the perforated or porous surface 578. The fluid transfer device 574 may also be a pump or compressor for providing a fluid pressure to the perforated or porous surface 578. The fluid source 572 may be a liquid reservoir, a pressurized gas tank, or some other fluid storage device. A pressure sensor 576 may be coupled to the fluid source 572 for measuring the fluid pressure in the fluid source 572. The pressure sensor 576 may also be coupled to the perforated or porous surface 578 for measuring a fluid pressure over the perforated or porous surface 578. The pressure sensor 576 may supply fluid pressure data to the fluid transfer device 574. The fluid transfer device 574 may control a supply of fluid from the fluid source 572 to the perforated or porous surface 578 based on data supplied by the pressure sensor 576.

In another embodiment, the environment 570 includes a velocity sensor 577 coupled to the perforated or porous surface 578. The velocity sensor 577 may measure the velocity of the flow of the fluid over the perforated or porous surface 578. The velocity sensor 577 may supply the fluid transfer device 574 with fluid velocity data. The fluid transfer device 574 may control a supply of fluid from the fluid source 572 to the perforated or porous surface 578 based on data supplied by the velocity sensor 577.

While this disclosure has been particularly shown and described with reference to preferred embodiments, it will be understood by those skilled in the art that various changes in form and detail may be made therein without departing from the spirit and scope of the invention. The inventors expect skilled artisans to employ such variations as appropriate, and the inventors intend the invention to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, and by way of example, although the headings refer to a "Technical Field," the claims should not be limited by the language chosen under this heading to describe the so-called field. Further, a description of a technology as background information is not to be construed as an admission that certain technology is prior art to any embodiment(s) in this disclosure. Neither is the "Brief Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

What is claimed:

1. A reduced drag surface comprising:
   a perforated or porous surface exposed to a flowing fluid; and
   a slip interface disposed between the perforated or porous surface and the flowing fluid, wherein the slip interface is formed from an entrapped fluid trapped at the perforated surface or the porous surface, wherein the entrapped fluid remains within the perforations or pores of the surface and the entrapped fluid does not enter the flowing fluid.

2. The reduced drag surface of claim 1, wherein the entrapped fluid is a gas, and wherein the slip interface is formed from an array of bubbles of the gas.

3. The reduced drag surface of claim 1, wherein the entrapped fluid is a liquid, and wherein the slip interface is formed, at least in part, from the liquid trapped at the perforated or porous surface.

4. The reduced drag surface of claim 1, wherein the perforated or porous surface is formed from a hydrophobic material or a hydrophilic material.

5. The reduced drag surface of claim 1, further comprising a microtexture projecting outwardly from the perforated or porous surface.

6. The reduced drag surface of claim 5, wherein the microtexture comprises at least one of a post, a waffle pattern, or a baffle.

7. The reduced drag surface of claim 1, wherein the perforated or porous surface is suspended over a cavity supplying the entrapped fluid.

8. The reduced drag surface of claim 7, wherein the perforated or porous surface is flexible, and wherein the perforated or porous surface is configured to flex inwardly into the cavity when exposed to a negative pressure.

9. The reduced drag surface of claim 7, wherein the cavity is filled with a porous material.

10. The reduced drag surface of claim 1, wherein the perforated or porous surface is an exterior surface of a volume of porous material filling a cavity that supplies the entrapped fluid.

11. The reduced drag surface of claim 1, further comprising: a second perforated or porous surface exposed to the flowing fluid; and a slip interface disposed between the second perforated or porous surface and the flowing fluid, wherein the slip interface is formed from the entrapped fluid trapped at the second perforated or porous surface.

12. The reduced drag surface of claim 1, wherein the flowing fluid and the entrapped fluid are in different phases.

13. The reduced drag surface of claim 1, wherein the flowing fluid and the entrapped fluid are not in different phases.

14. The reduced drag surface of claim 8, wherein: the perforated or porous surface has a thickness t; the cavity is a rectangular channel comprising a largest dimension L; and the cavity has a height h that is substantially less than $L^4/t^3$.

15. A method for modifying a drag coefficient on a reduced drag surface, the method comprising: supplying a fluid to a perforated or porous surface exposed to a flowing fluid, wherein the perforated or porous surface traps the fluid at the perforated or porous surface to form an entrapped fluid; forming a slip interface between the perforated or porous surface and the flowing fluid, wherein the slip interface is formed from the entrapped fluid, wherein the entrapped fluid remains within the perforations or pores and does not enter the flowing fluid.

16. The method of claim 15, further comprising: modifying the supply of the fluid to the perforated or porous surface based on a change in pressure exerted on the perforated or porous surface by the flowing fluid or the velocity of the flowing fluid.

17. The method of claim 16, wherein modifying the supply of the fluid to the perforated or porous surface comprises increasing a pressure of the fluid to the perforated or porous surface.

18. The method of claim 15, further comprising: providing a negative pressure to the perforated or porous surface to increase the drag coefficient of the reduced drag surface.

19. An apparatus comprising: a reduced drag surface that includes: a perforated or porous surface exposed to a flowing fluid, and a slip interface disposed between the perforated or porous surface and the flowing fluid, wherein the slip interface is formed from an entrapped fluid trapped at the perforated or porous surface; and a source of fluid, wherein the source is fluidically coupled to the perforated or porous surface, and wherein the source of the fluid supplies fluid to the perforated or porous surface trapped at the perforated or porous surface to form the entrapped fluid; wherein the entrapped fluid remains within the perforations or pores and does not enter the flowing fluid.

20. The apparatus of claim 19, further comprising: a pressure sensor coupled with the perforated or porous surface; and a fluid transfer device coupled with the source of fluid, wherein the fluid transfer device controls a supply of the fluid to the perforated or porous surface based on data supplied by the pressure sensor.

21. The apparatus of claim 19, further comprising: a velocity sensor coupled with the perforated or porous surface to measure the velocity of the flow over the perforated or porous surface; and a fluid transfer device coupled with the source of fluid, wherein the fluid transfer device controls a supply of the fluid to the perforated or porous surface based on data supplied by the velocity sensor.

* * * * *